Figure 1:
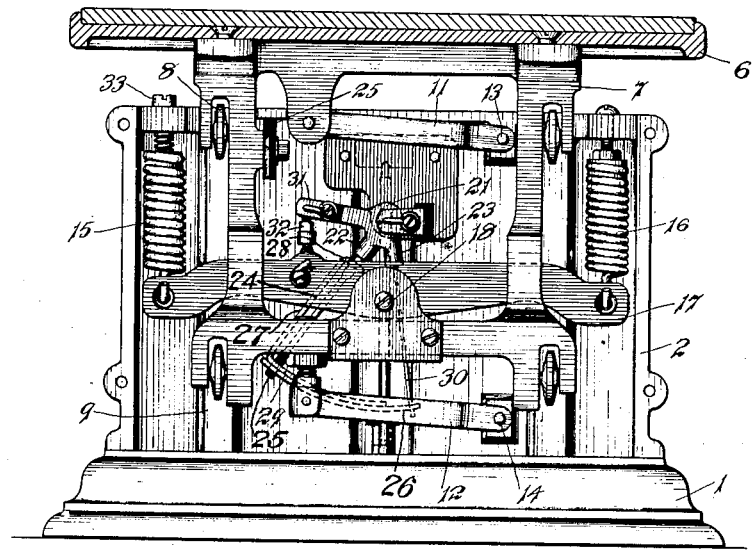

G. WALKER.
WEIGHING MACHINE.
APPLICATION FILED APR. 21, 1913.

1,132,891.

Patented Mar. 23, 1915.

WITNESSES:

INVENTOR.
George Walker:

BY

ATTORNEY.

UNITED STATES PATENT OFFICE.

GEORGE WALKER, OF NEW BRITAIN, CONNECTICUT, ASSIGNOR TO LANDERS, FRARY & CLARK, OF NEW BRITAIN, CONNECTICUT, A CORPORATION OF CONNECTICUT.

WEIGHING-MACHINE.

1,132,891.   Specification of Letters Patent.   Patented Mar. 23, 1915.

Application filed April 21, 1913. Serial No. 762,487.

*To all whom it may concern:*

Be it known that I, GEORGE WALKER, a citizen of the United States, and a resident of New Britain, in the county of Hartford and State of Connecticut, have invented certain new and useful Improvements in Weighing-Machines, of which the following is a specification.

This invention relates generally to weighing machines, but the particular object of the invention has been to produce a very small and compact machine having great accuracy and large capacity. A machine of this character is especially well designed for use as a bath room scale, because of its size and the arrangement of the dial and pointer below the load-receiving platform so that a person standing upon the platform and looking down is able to read the weight indicated on the dial.

The machine is of course adapted for use in the weighing of all sorts of objects and commodities, and its especial novelty is to be found in the mechanism which I have devised and which permits of an extremely compact construction coupled with accuracy of operation and large capacity.

An embodiment of the invention is shown in the drawings wherein—

Figure 2:
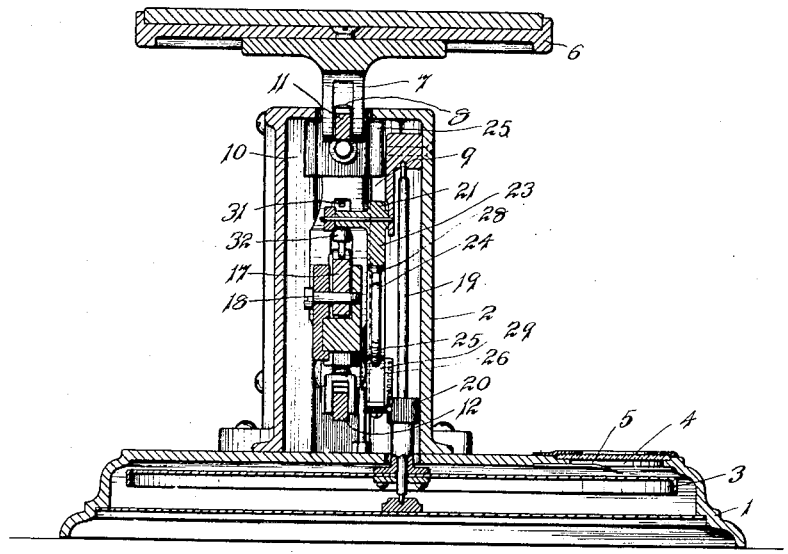

Figure 1 is a side view with a part of the casing removed. Fig. 2 is a central transverse sectional view.

Describing the embodiment of the invention illustrated in the drawings, 1 denotes the base and 2 the low upstanding casing mounted thereon and preferably integral therewith. The base is recessed in its underside and projects to the front beyond the load-receiving platform, and under the base is mounted a dial 3, the graduations of which move under a sight aperture 4 and a fixed pointer 5. Of course it is immaterial whether this, or the reverse arrangement of stationary dial and movable pointer is used.

The platform 6 is mounted at the top of the load-receiving frame 7 which has a limited vertical movement within the casing and carries anti-friction devices, such as rollers 8, which contact with the tracks 9 or 10 in the front and rear walls of the casing respectively, these tracks being spaced apart a distance slightly greater than the diameter of the rollers, preventing all but the slightest amount of shifting of the frame.

The frame is positioned and guided in its vertical motion by the upper and lower levers 11, 12, one end of each lever being mounted on a fixed pivot 13, 14, which is secured either in the casing or in some other stationary part, the other ends of these levers being connected with the frame and in vertical alinement. The balance springs 15, 16 are attached to the ends of a spring bar 17, which is centrally connected to the center of the load-receiving frame as at 18, between the guide levers 11, 12. A rectifying or tare adjustment 33 is provided for one of the springs, 15.

The dial is mounted on a vertical shaft 19 which is supported in suitable bearings in the casing and carries a pinion 20.

21 denotes a rack carrier supported upon a fixed pivot. This carrier has two diverging arms, 22, 23, to one of which, 22, is secured a stem 24 having a threaded end 25 on which the rack 26 is adjustably mounted. The manner of this mounting is as follows:—A holder 27 is provided with apertured lugs 28, 29, the aperture in the former being large enough to slide freely over the stem, and that in the latter being threaded to engage the thread at the end of the stem the rack 26 being attached to the lug 29. By rotating the holder the rack can be adjusted up and down the stem to change its leverage. In the other arm 23 there is secured a light spring member 30, which enters an aperture in the free end of the rack and yieldingly holds it in position. This spring can be readily disengaged from the rack in case it needs adjustment on the stem 24. That part of the stem between the lugs 28, 29, on the holder is of reduced size in order that it may yield slightly when a load is abruptly placed on the platform to relieve the rack and pinion from undue strain. The carrier has also a lever arm 31 which is connected by a link 32 with a moving part of the mechanism, as the spring bar, and preferably in alinement with the points of attachment of the upper and lower levers with the frame.

Another feature of construction which is of great importance in order to secure the greatest accuracy for weighing small loads as well as large, and for indicating any change in the amount of the load resides in having all parts of the mechanism, including the balance springs, spring bar, the frame, the guide levers, and the lever arm of the carrier connected on what may be termed the longitudinal center of the frame; in other words the points of connection between the balance springs and the spring bar, the spring bar and the frame, the frame and the guide levers, and the spring bar and the lever arms of the carrier lie in the central plane of the frame. This prevents cramping between the various parts and insures extreme accuracy.

The top of the casing overhangs the mechanism and the frame is provided with a stop 25 which engages the top in order that the machine may be handled and lifted by the platform without seriously disturbing the mechanism.

From this description it will be seen that the downward movement of the frame due to the presence of a load on the platform is resisted by the balance springs acting through the spring bar, and that this downward motion is communicated to the rack through the link and the lever arm of the carrier, and the rack meshing with the pinion actuates the dial.

The weighing machine here illustrated and described represents the embodiment of an unusually complete mechanism in a compact space, having a delicate and extremely accurate action yet of substantial capacity; and having a novel and very convenient collocation of platform and dial.

Change or modification based upon the principle of construction and operation here described may be made without departing from the scope of the invention as outlined in the appended claims.

I claim as my invention:—

1. In a weighing machine, a recessed base, a low upstanding casing thereon, weighing mechanism within said casing, including a load-receiving frame projecting through the top of said casing, a platform on said frame, a recessed extension at one side of said base having a sight aperture in its upper wall beyond the edge of said platform, a dial within the recessed base and extension the graduations of which register with said aperture, a pointer, and means actuated by said frame for producing relative motion between said dial and pointer, said movable part being positively actuated in opposite directions.

2. In a weighing machine, a low upstanding casing, a vertically moving load-receiving frame mounted therein, a platform on said frame, a horizontally oscillating indicator arranged below said platform and exposed beyond the edge thereof, and a connection between said frame and indicator including a part which swings in a vertical plane, driven by said frame and driving said indicator.

3. A casing, a load-receiving frame mounted therein for vertical movement, balance springs connected between said frame and casing, rollers carried by said frame, and oppositely arranged tracks on the front and rear of said casing and on which said rollers run, the distance between the opposed tracks being slightly greater than the diameter of the rollers.

4. A casing, a load-receiving frame therein, balance springs, an interposed member forming a connection between said springs and frame, and movable relatively to the latter, guide levers connected with said frame, pivotal supports for said levers, indicating mechanism including a movable member, and connections between said interposed member and the movable member of said indicating mechanism.

5. A casing, a load-receiving frame mounted therein, balance springs, a spring bar, a pivotal connection between said bar and frame and between the ends of said bar and said springs, indicating mechanism including a movable member, means for actuating said movable member, and connections between said means and said spring bar.

6. A casing, a rectangular load-receiving frame mounted therein for vertical movement, guide levers for said frame, a spring bar mounted on and movable relatively to said frame between said levers, balance springs connected between the casing and the ends of said bar, indicating mechanism, operating means therefor, and operative connections between said bar and operating means.

7. A casing, a rectangular load-receiving frame mounted therein for vertical movement, guide levers respectively connected at one end to the top and bottom of said frame, stationary pivots on which the opposite ends of said levers are mounted, balance springs supported by said casing, a spring bar centrally supported at the center of said frame and connected at its ends with said springs, indicating mechanism, operating means therefor, and connections between said bar and operating means in substantial alinement with the points of connection of the guide levers with the frame.

8. In a weighing machine, the combination with weighing mechanism and indicating mechanism including a movable member, of connections between the former and the movable member of the latter comprising a pinion on said movable member, a pivotally mounted rack carrier connected with said weighing mechanism, and a rack adjustably mounted on said carrier.

9. In a weighing machine, the combination with weighing mechanism and indicating mechanism including a movable member, of connections between the former and the movable member of the latter comprising a pinion on said movable member, a rack carrier connected with said weighing mechanism, a rack adjustably mounted on said carrier, and holding means for said rack.

10. In a weighing machine, the combination with weighing mechanism and indicating mechanism including a movable member, of connections between the former and the movable member of the latter comprising a pinion on said movable member, a rack carrier connected with said weighing mechanism, a rack adjustably mounted on said carrier, and yielding holding means for said rack.

11. In a weighing machine, the combination with the weighing mechanism and indicating mechanism including a movable member, of connections between the former and the movable member of the latter comprising a pinion on said movable member, a rack carrier connected with said weighing mechanism, a stem on said carrier, a holder provided with apertured lugs to receive said stem, one of said lugs having threaded engagement therewith, and a rack secured to said holder.

12. In a weighing machine, the combination with the weighing mechanism and indicating mechanism including a movable member, of connections between the former and the movable member of the latter comprising a pinion on said movable member, a rack carrier connected with said weighing mechanism, a stem on said carrier, a holder provided with apertured lugs to receive said stem, one of said lugs having threaded engagement with said stem, a rack secured to said holder, and a spring member mounted on the carrier and engaging the end of said rack.

13. In a weighing machine, the combination with the weighing mechanism and indicating mechanism including a movable member, of connections between the former and the movable member of the latter comprising a pinion on said movable member, a rack carrier connected with said weighing mechanism, a stem on said carrier, a holder provided with apertured lugs to receive said stem, one of said lugs having threaded engagement with said stem, a rack secured to said holder, the part of the stem between said lugs being reduced in size to permit a slight spring of the stem under abnormal conditions.

14. In a weighing machine, the combination with the weighing mechanism and indicating mechanism including a movable member, of connections between the former and movable member of the latter, comprising a pinion on said movable member, and a rack carrier, said carrier being provided with a lever arm connected with said weighing mechanism and a pair of diverging arms; a stem capable of slight yielding action under abnormal conditions, secured to one arm, a rack adjustably mounted on said stem, and a spring member secured to the other arm and detachably engaging the end of said rack.

15. In a weighing machine, a rectangular load-receiving frame, balance springs and fixed supports therefor, guide levers connected to the transverse members of said frame at one side of its center, and with their opposite ends mounted on fixed pivots at the opposite side of the center, and a spring bar centrally connected with the frame between said levers and connected at its ends with said balance springs.

16. In a weighing machine, a load-receiving frame, balance springs and fixed supports therefor, a spring bar secured at its center pivotally to said frame and connected at its ends to said springs, guide levers, one above and one below said bar, fixed pivots on which an end of each lever is mounted, the other ends being connected with said frame, indicating mechanism and operating means therefor connected to said bar.

17. In a weighing machine, a rectangular load-receiving frame including upper and lower frame members, balance springs and a fixed support therefor, an intermediate member connecting said springs and frame, guide levers provided at one end with fixed pivotal supports and extending laterally to connect with the undersides of the upper and lower frame members, indicating mechanism and operating means therefor connected to said intermediate member in alinement with said lever and frame connections.

18. In a weighing machine, a vertically-moving load-receiving frame, balance springs, a spring bar connecting said springs and frame, guide levers for said frame, a carrier, and connections between said carrier and spring bar, the points of connection between said parts lying in the plane of the longitudinal center of said frame, indicating mechanism and operative connections between said carrier and mechanism.

19. In a weighing machine, a casing, a pair of opposed tracks on opposite inner walls near each end of said casing, a load-receiving frame vertically movable within said casing, anti-friction devices carried by said frame and arranged between the members of each pair of tracks and adapted to contact with but one track of each pair at the same time, balance springs connected with the frame, and indicating mechanism actuated from the frame.

GEORGE WALKER

Witnesses:
 CHAS. D. INSIE,
 JOSEPH F. LAMB.